United States Patent [19]

Meacham, Jr.

[11] Patent Number: 4,503,883

[45] Date of Patent: Mar. 12, 1985

[54] GAS PRESSURE REGULATOR WITH UNDER AND OVER SHUT-OFF

[75] Inventor: Thomas E. Meacham, Jr., Holland, Pa.

[73] Assignee: The Singer Company, Stamford, Conn.

[21] Appl. No.: 620,764

[22] Filed: Jun. 15, 1984

[51] Int. Cl.³ .............................................. F16K 17/64
[52] U.S. Cl. .................................... 137/458; 137/463; 137/461
[58] Field of Search ...................... 137/458, 463, 461; 251/73

[56] References Cited

U.S. PATENT DOCUMENTS

| | | | |
|---|---|---|---|
| 2,581,071 | 1/1952 | Born | 137/458 |
| 3,228,417 | 1/1966 | Schwerter | 137/463 X |
| 3,386,465 | 6/1968 | Johnson | 137/463 |
| 3,580,271 | 5/1971 | Farrer | 137/458 |

Primary Examiner—Harold W. Weakley
Attorney, Agent, or Firm—David L. Davis; Robert E. Smith; Edward L. Bell

[57] ABSTRACT

A gas pressure regulator including an under and over pressure shut-off valve assembly has a toggle mechanism which "breaks" a critical connection when the outlet pressure gets too high.

4 Claims, 4 Drawing Figures

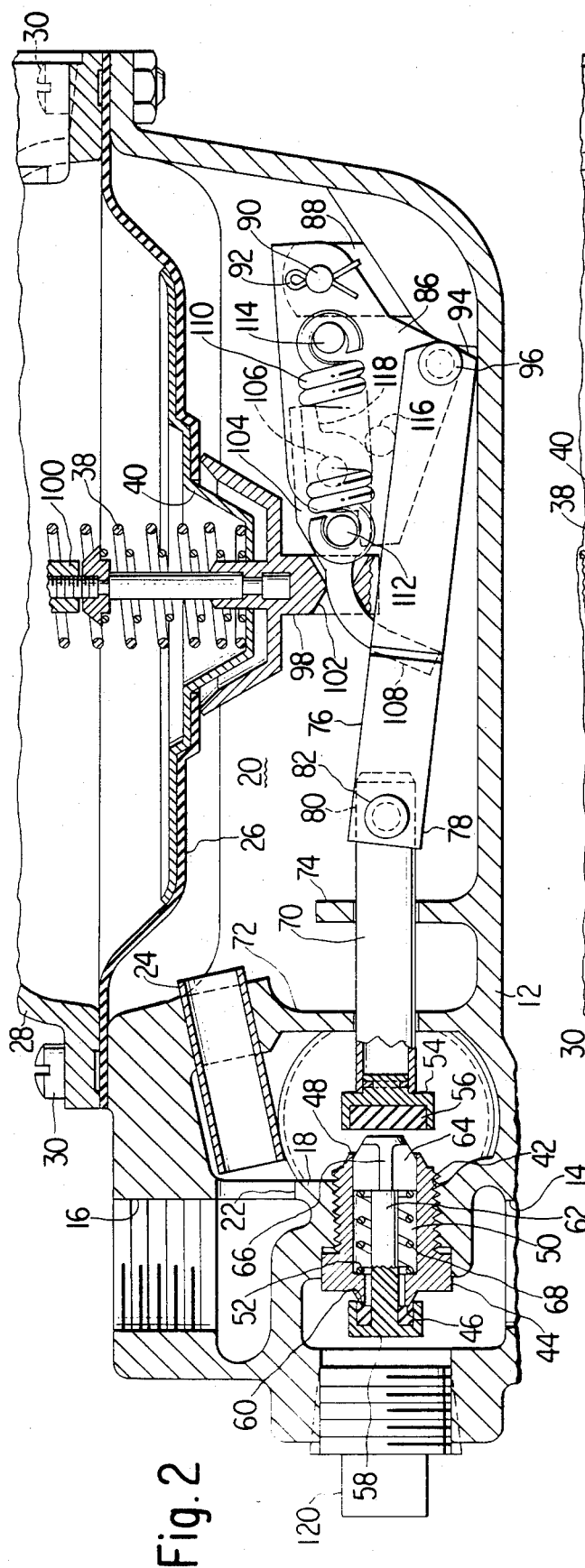
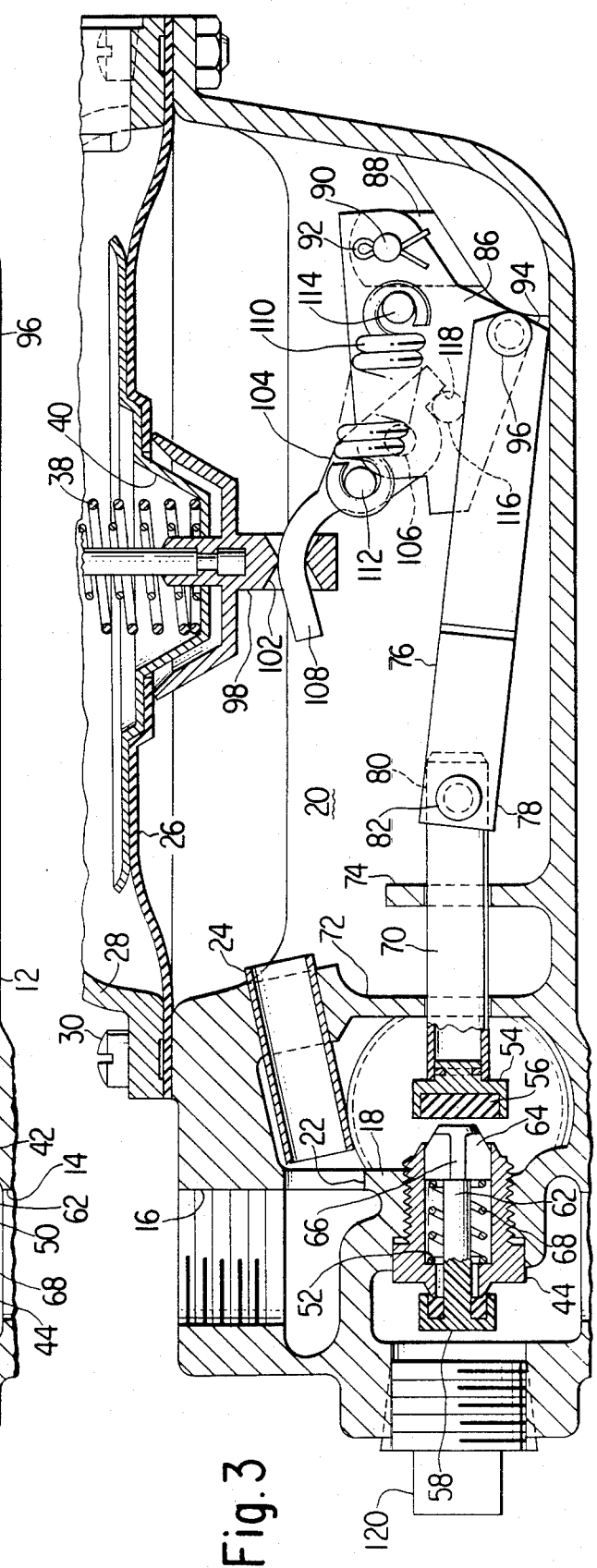
Fig. 2
Fig. 3

GAS PRESSURE REGULATOR WITH UNDER AND OVER SHUT-OFF

DESCRIPTION

Background of the Invention

This invention relates to gas pressure regulators and, more particularly, to a gas pressure regulator including an under and over pressure shut-off valve.

It is an object of the present invention to provide an improved under and over pressure shut-off mechanism for a gas pressure regulator which may be retrofit into an existing pressure regulator design.

Summary of the Invention

The foregoing and additional object are obtained in accordance with the principals of this invention by providing, in a conventional gas pressure regulator, a toggle mechanism linking the diaphragm to the regulator valve. The toggle mechanism is an "over center" device both in normal operation and for tripping purposes and is positioned in the back of the regulator, i.e., on the remote side of the diaphragm stem from the inlet and outlet pipes. During an over pressure condition, the toggle mechanism trips to move the regulator valve away from its valve seat. During an under pressure condition, the regulator valve is also moved away from its valve seat. The shut-off valve has a stem portion which contacts the regulator valve so that during normal operating conditions of the regulator, the shut-off valve is kept in an open condition. However, during both the under and over pressure conditions when the regulator valve moves away from its valve seat, the shut-off valve is allowed to contact its valve seat, shutting off all gas flow from the inlet. The shut-off valve and the regulator valve are separate mechanisms so that installation in an existing regulator is easily effected.

BRIEF DESCRIPTION OF THE DRAWINGS

The foregoing will be more readily apparent upon reading the following description in conjunction with the drawings in which like elements in different figures thereof have the same reference character applied thereto and wherein:

FIG. 2 is an enlarged sectional view of the regulator of FIG. 1 showing the mechanism in an under pressure condition;

FIG. 3 is an enlarged sectional view similar to FIG. 2 showing the mechanism in an over pressure condition.

DETAILED DESCRIPTION

Figure 1:
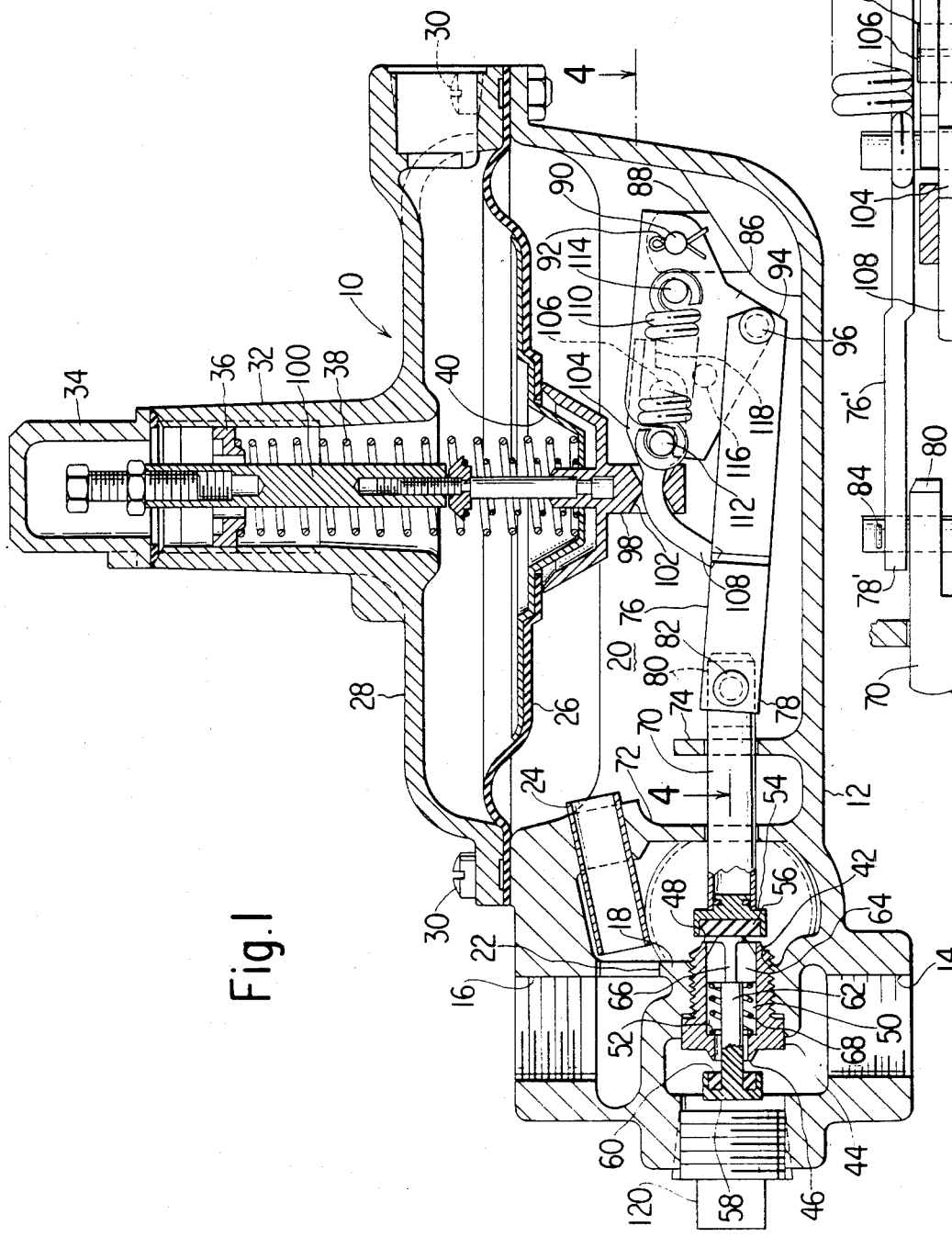
FIG. 1 is a longitudinal section of a gas pressure regulator equipped in accordance with the present invention, showing the regulator elements under normal operating conditions.

Referring now to the drawings, FIG. 1 shows a gas pressure regulator, designated generally by the reference numeral 10. The regulator 10 includes a housing 12 having an inlet 14, an outlet 16, a transverse wall 18 between the inlet and the outlet and a chamber 20 communicating with the outlet 16 via the passageway 22 and the conduit 24. The outer periphery of a flexible diaphragm 26 is clamped between mating surfaces of the housing 12 and a bonnet 28, as by bolts 30. The diaphragm 26 closes the chamber 20. As is conventional, the bonnet 28 includes a central upwardly projecting tubular portion 32 closed by a cap 34. The tubular portion 32 is internally threaded and an adjustment nut 36 engages those internal threads and contacts the upper end of a load spring 38. The load spring 38 is a coil compression spring and the lower end thereof sits upon a diaphragm plate 40 disposed on one side of the diaphragm 26 so as to have the spring force bear upon the diaphragm 26, thereby yieldably loading the side of the diaphragm 26 remote from the outlet 16.

The transverse wall 18 is formed with an internally threaded aperture 42 in which an orifice member 44 is threadedly secured. The orifice member 44 has a first valve seat 46 on the inlet side, a second valve seat 48 on the outlet side, and a passage 50 communicating with the first and second valve seats 46 and 48, respectively. The orifice member 44 is further formed with an inwardly extending shoulder portion 52 within the passage 50 in the vicinity of the first valve seat 46.

Valving action for the regulating function of the regulator 10 is performed by a regulator valve member 54 which includes a non-metallic seat disc 56 which coacts with the annular conical second valve seat 48 of the orifice member 44. The flow shut-off function is performed by a shut-off valve member 58 having a non-metallic seat disc 60 which coacts with the annular conical first valve seat 46 of the orifice member 44. The shut-off valve member 58 includes a stem section 62 extending through the passage 50 of the orifice member 44. The stem section 62 has an outwardly extending shoulder portion 64 with longitudinally extending open channels therein for the passage of gas therethrough. Surrounding the stem section 62 is a coiled compression spring 68 which bears against the inwardly extending shoulder 52 and the outwardly extending shoulder portion 64 to bias the shut-off valve member 58 into closing contact with the first valve seat 46. The stem section 62 is of sufficient length that the shoulder portion 64 extends outwardly of the passage 50 beyond the second valve seat 48 to contact the regulator valve member 54 under normal operating conditions of the regulator so that the shut-off valve member 58 is prevented from contacting the first valve seat 46 under such conditions.

Figure 4:
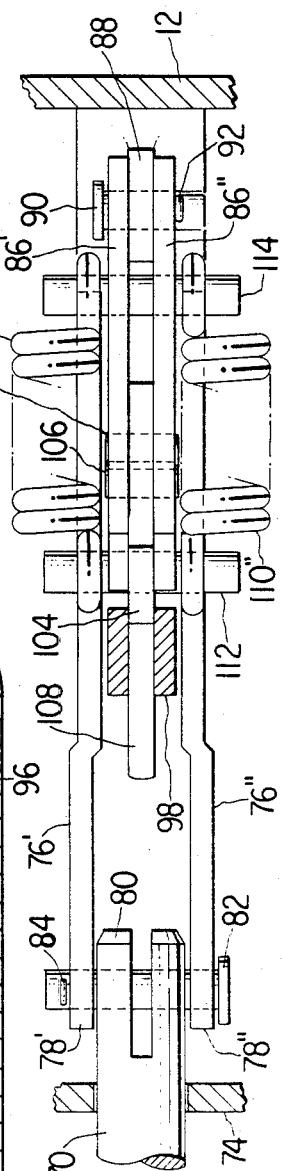
FIG. 4 is a top plan view of the toggle mechanism.

Connected to the regulator valve member 54 is a plunger 70 extending into the chamber 20. The plunger 70 is supported for reciprocatory axial movement, as for example by extending through suitable openings in the walls 72 and 74, to move the regulator valve member 54 toward and away from the second valve seat 48. A link 76, illustratively consisting of a pair of link members 76' and 76" as shown in FIG. 4, has a first end 78 pivotally connected to the end 80 of plunger 70 which is remote from the regulator valve member 54. Illustratively, this connection is by means of a clevis pin 82 extending through suitable openings in the plunger 70 and the link 76 and held in place by a cotter pin 84.

A plate 86, illustratively consisting of two plate members 86' and 86" as shown in FIG. 4, in mounted for pivotal motion about a first pivot point within the chamber 20. Illustratively, an upstanding wall segment 88 extends into the chamber 20 and the plate 86 is pivotally connected thereto by a clevis pin 90 extending through suitable openings in the plate 86 and the wall segment 88 and held by a cotter pin 92 to provide the first pivot point. The plate 86 is connected at a second pivot point to the second end 94 of the link 76, illustratively by a clevis pin 96.

A diaphragm stem member 98 is coupled for movement with the diaphragm 26 and extends into the chamber 20. The stem member 98 is coupled to the diaphragm 26 because the diaphragm 26 is normally clamped between the stem member 98 and the diaphragm plate 40, with the interconnection therebetween being held by the force of the spring 38. An extension rod assembly 100 is fixedly engaged with the stem member 98 and extends upwardly through the tubular portion 32 and the adjustment nut 36 to terminate within the cap 34. The end of the stem member 98 most remote from the diaphragm 26 within the chamber 20 includes a transverse opening 102 therethrough.

A lever 104 is mounted on the plate 86 for pivotal motion about a third pivot point 106, the third pivot point 106 being a pin extending between the plates 86' and 86", through a suitable opening in the lever 104. The lever 104 is formed with a curved arm 108 which extends through the transverse opening 102 and is slidable therein. A coiled tension spring 110, illustratively including two springs 110' and 110" as shown in FIG. 4, is connected between a first anchor point 112 on the lever 104 and a second anchor point 114 on the plate 86, the anchor points 112 and 114 illustratively comprising pins extending through the lever 104 and the plate 86, as shown in FIG. 4.

FIG. 1 illustrates the operation of the regulator 10 under normal conditions of pressure. The diaphragm 26 and the spring 38 constitute control means responsive to the pressure in the chamber 20. In operation, the diaphragm 26 moves up or down until the outlet pressure in the chamber 20 on the underside of the diaphragm 26 reaches equilibrium with the spring pressure on the upper side of the diaphragm. During normal operation of the pressure regulator 10, the flow of gas through the passage 50 of the orifice member 44 is controlled responsive to the movement of the diaphragm 26. As the outlet pressure falls the diaphragm 26 moves downwardly, causing the lever 104 to attempt to pivot about the pivot point 106. However, a line drawn between the anchor points 112 and 114 lies below the pivot point 106 so that the forces exerted by the spring 110 causes the plate 86 to move with the lever 104, thereby pivoting both the plate 86 and the lever 104 about the pin 90. This causes the link 76 to move to the right, pulling the plunger 70 and moving the regulator valve member 54 away from the second valve seat 48. Larger amounts of gas are thus allowed to flow through the passage 50. When the pressure in the chamber 50 increases, the diaphragm 26 will move up, causing the lever 104 and the plate 86 to pivot in a clockwise direction, resulting in the plunger 70 being pushed toward the left to bring the regulator valve member 54 closer to the valve seat 48, decreasing the amount of gas that may flow through the passage 50, until the valve seat disc 56 engages the seat 48 to completely shut off the flow until such time as the outlet pressure is lessened to cause the valve member 54 to again shift toward the right away from engagement with the seat 48, thus reopening the passage 50 and resuming the pressure controlled flow in the regulator 10. During this normal operation of the regulator 10, the end of the shoulder portion 64 of the stem section 62 of the shut-off valve member 58 will be pushed leftwardly by continued engagement with the seat disc 56 of the regulator valve member 54 so as to positively hold the seat disc 60 of the shut-off valve member 58 away from the valve seat 46, although the distance may vary within a predetermined range so long as the valve member 54 remains operative, so that the passage 50 will remain open from the inlet side of the orifice member 44.

FIG. 2 illustrates the regulator 10 when the outlet pressure communicated to the chamber 20 drops below a predetermined lower limit. In this case, the diaphragm 26 drops to a point where the lever 104 and plate 86 pivot counterclockwise to such an extent that the pin 116 fixed on the plate 86 contacts the upper edge of the link 76 after the link 76 has moved to the right and pulled the plunger 70 a sufficient distance so that the regulator valve member 54 no longer engages the rightward end of the shut-off valve member 58 shoulder portion 64. When this occurs, the spring 68 forces the shut-off valve member 58 toward the right until the seat disc 60 engages the valve seat 46 to shut off all flow through the passage 50 and produce a lock-down position aided by the force of the inlet pressure acting on the front face of the shut-off valve member 58. This will prevent the pressure regulator 10 from functioning until it is manually reset. Manual reset is accomplished by removing the cap 34 and lifting the extension rod assembly 100 to bring the regulator valve member 54 into contact with the end of the shut-off valve member 58 and move the shut-off valve member 58 out of engagement with the valve seat 46.

FIG. 3 illustrates the condition where the outlet gas pressure communicated to the chamber 20 exceeds a predetermined upper limit. In this case, the diaphragm 26 moves upwardly to such an extent that the regulator valve member 54 engages the valve seat 48, thereby shutting off flow through the passage 50. If the outlet pressure continues beyond this point, the diaphragm 26 is forced upwardly against the action of the spring 38. The seat disc 56 is forced increasingly more tightly upon the valve seat 48. Accordingly, the plate 86 is no longer able to pivot in a clockwise direction about the pin 90. Further upward movement of the diaphragm 26 results in pivoting the lever 104 about the pivot point 106, extending the spring 110. As result, the line between the anchor points 112 and 114 will move to the other side of the pivot point 106, whereupon the spring 110 contracts again so that the lever 104 swings around by an over center trip action and thus "breaks" the connection between the lever 104 and the plate 86. Consequently, the extension 118 of the lever 104 will bear against the pin 116 to pivot the plate 86 counterclockwise about the pin 90 to its furthest extent and move the regulator valve member 54 away from the valve seat 48 a sufficient distance to eliminate engagement between the regulator valve member 54 and the shut-off valve member 58 so that the shut-off valve seat disc 60 engages the valve seat 46 to shut off all flow through the passage 50. This condition will be maintained until the regulator is manually reset by removing the cap 34 and pressing down on the extension rod assembly 100 to remake the connection between the lever 104 and the plate 86. At this time, the regulator will be in the condition shown in FIG. 2 and the extension rod assembly 100 must then be lifted to reopen the shut-off valve.

Accordingly, there has been disclosed a gas pressure regulator including an under and over pressure shut-off assembly which my be retrofit into an existing regulator. The shut-off valve assembly is assembled to the orifice member 44 by inserting the shut-off valve member 58 stem section 62 into the passage 50 of the orifice member 44, placing the spring 68 around the stem section 62, and then ultrasonically welding the shoulder portion 64 to the stem section 62. The plug 120 is removed from the housing 12 and the regulator valve member 54 is inserted through the opening exposed by the removal of the plug 120 and through the aperture 42 so that the plunger 70 goes through the openings in the walls 72 and 74. The orifice member 44 containing the assembled shut-off valve assembly is then inserted in the opening exposed by the plug 120 and threadedly secured in the threaded aperture 42. The plug 120 is then replaced. The toggle mechanism including the link 76, the plate 86 and the lever 104 is then connected to the plunger 70 and the diaphragm stem member 98 and the remainder of the regulator is assembled in a conventional known manner. It is noted that the plate 86 is entirely in the back of the regulator 10, i.e., on the side of the stem member remote from the piping. This design, as well as the fact that the toggle mechanism is an over center device both in normal operation and for tripping, provides increased forces to operate the regulator valve.

It is understood that the above-described embodiment is merely illustrative of the application of the principles of this invention. Numerous other embodiments may be devised by those skilled in the art without departing from the spirit and scope of this invention, as defined by the appended claims.

I claim:

1. A gas pressure regulator comprising:
   a housing having an inlet, an outlet, a transverse wall therebetween, and a chamber communicating with the outlet;
   a diaphragm closing the chamber;
   means yieldably loading the side of the diaphragm remote from the outlet;
   an orifice member connected in the transverse wall having a first valve seat on the inlet side, a second valve seat on the outlet side, and a passage therethrough communicating with said first and second valve seats;
   a regulator valve member cooperating with the second valve seat of the orifice member;
   a shut-off valve member within the orifice member cooperating with the first valve seat, said shut-off valve member including a stem section extending through said passage of said orifice member to contact said regulator valve member under normal operating conditions of said regulator so that the shut-off valve member is prevented from contacting said first valve seat under such normal operating conditions;
   means for yieldably biasing said shut-off valve member into closing contact with said first valve seat;
   a plunger connected to said regulator valve member, said plunger extending into said chamber and supported for reciprocatory axial movement to move said regulator valve member toward and away from said second valve seat;
   a link having a first end pivotally connected to the end of said plunger remote from said regulator valve member;
   a plate mounted for pivotal motion about a first pivot point within said chamber, said plate being pivotally connected at a second pivot point to the second end of said link;
   a stem member coupled for movement with said diaphragm and extending into said chamber; a lever coupled to said stem member, said lever being mounted on said plate for pivotal motion about a third pivot point; and
   a coiled tension spring connected between a first anchor point on said lever and a second anchor point on said plate;
   said first and second anchor points being so situated that a straight line drawn therebetween lies on a first side of said third pivot point under normal operating conditions of said regulator so that said lever and said plate pivotally move as one about said first pivot point over a range of chamber gas pressures to cause opening movement of the regulator valve member away from said second valve seat upon decrease of chamber gas pressure and closing movement of the regulator valve member toward said second valve seat upon increase of chamber gas pressure, and when the chamber gas pressure exceeds a predetermined upper limit the regulator valve member contacts said second valve seat so that said plate can no longer pivot about said first pivot point and the lever pivots relative to the plate about said third point to extend said spring and move the line between the first and second anchor points to the other side of the third pivot point to "break" the connection between the lever and the plate, said spring then contracting and thereby causing the plate to pivot about the first pivot point in a direction as to pull the link and plunger to move the regulator valve member away from said second valve seat a sufficient distance to allow said shut-off valve member to contact said first valve seat and thereby close said orifice member passage, and when the chamber gas pressure drops below a predetermined lower limit the lever and plate pivot as one about the first pivot point in said direction to such an extent that the regulator valve member is moved away from said second valve seat a sufficient distance to allow said shut-off valve member to contact said first valve seat and thereby close said orifice member passage.

2. The regulator according to claim 1 wherein said plate lies entirely on the side of said stem member remote from said second valve seat.

3. The regulator according to claim 2 wherein said stem member is formed with a transverse opening therethrough and said lever includes an arm slidably received in said opening.

4. The regulator according to claim 1 wherein said shut-off valve member stem section includes an outwardly extending shoulder portion having longitudinally extending open channels therein for the passage of gas therethrough, said shoulder portion being on that end of said stem section adapted to contact said regulator valve member, said orifice member being formed with an inwardly extending shoulder portion within said passage in the vicinity of said first valve seat, and said shut-off valve member biasing means includes a coiled compression spring surrounding said stem section between said outwardly extending shoulder portion of said stem section and said inwardly extending shoulder portion of said orifice member.

* * * * *